(12) United States Patent
Dorion

(10) Patent No.: US 8,274,962 B2
(45) Date of Patent: Sep. 25, 2012

(54) RADIO COMMUNICATION SYSTEM MOBILE STATION WHICH CAN COMMUNICATE DIRECTLY WITH ANOTHER MOBILE STATION

(75) Inventor: Marc Dorion, Lyons (FR)

(73) Assignee: Sagem Communications, Paris (FR)

( * ) Notice: Subject to any disclaimer, the term of this patent is extended or adjusted under 35 U.S.C. 154(b) by 810 days.

(21) Appl. No.: 11/884,796

(22) PCT Filed: Feb. 22, 2006

(86) PCT No.: PCT/FR2006/000419
§ 371 (c)(1),
(2), (4) Date: May 22, 2008

(87) PCT Pub. No.: WO2006/090070
PCT Pub. Date: Aug. 31, 2006

(65) Prior Publication Data
US 2008/0304469 A1  Dec. 11, 2008

(30) Foreign Application Priority Data
Feb. 22, 2005 (FR) ..................... 05 01803

(51) Int. Cl.
*H04J 3/06* (2006.01)
(52) U.S. Cl. ........ 370/350; 370/312; 370/314; 370/329; 370/330; 370/337; 370/340; 370/341; 370/343; 370/345; 370/347
(58) Field of Classification Search .................. None
See application file for complete search history.

(56) References Cited

U.S. PATENT DOCUMENTS

| 5,570,369 A * | 10/1996 | Jokinen ...................... 370/311 |
| 5,748,621 A * | 5/1998 | Masuda et al. ............... 370/337 |
| 5,913,171 A * | 6/1999 | Solonen et al. ............... 455/502 |
| 5,995,500 A * | 11/1999 | Ma et al. ...................... 370/337 |
| 6,292,508 B1 * | 9/2001 | Hong et al. ................... 375/134 |
| 6,650,629 B1 | 11/2003 | Takahashi et al. |
| 2001/0046861 A1 * | 11/2001 | Attimont et al. ............. 455/434 |
| 2002/0025801 A1 * | 2/2002 | Yang ............................ 455/416 |
| 2004/0003133 A1 * | 1/2004 | Pradhan et al. .............. 709/318 |

FOREIGN PATENT DOCUMENTS

| EP | 0 671 859 A | 9/1995 |
| EP | 1 079 651 A | 2/2001 |

OTHER PUBLICATIONS

Gkelias et al. "HiperLAN2 for Vehicle-to-Vehicle Communication," 2002, IEEE.*

* cited by examiner

*Primary Examiner* — Jae Y Lee
(74) *Attorney, Agent, or Firm* — Gerald E. Helget; Nelson R. Capes; Briggs and Morgan, P.A.

(57) ABSTRACT

A mobile station of a mobile radiocommunication system for receiving synchronization channels transmitted on at least one carrier so as to be able to synchronize with a base station and transmit data in a traffic channel defined with respect to the synchronization channels.
The mobile station may transmit synchronization channels on a carrier normally transmitted by a base station. The mobile station may transmit a traffic channel on the carrier. The synchronization and traffic channels are transmitted to at least one other mobile station so the first mobile station can synchronize with the other mobile station and read the traffic channel.

12 Claims, 6 Drawing Sheets

RADIO COMMUNICATION SYSTEM MOBILE STATION WHICH CAN COMMUNICATE DIRECTLY WITH ANOTHER MOBILE STATION

BACKGROUND OF THE INVENTION

The present invention relates to a mobile station of a radio communication system which can enter into direct communication with at least one other mobile station.

A mobile station of a radio communication system is a mobile station which operates according to the specifications associated with this radio communication system. In the rest of the description, the radio communication system in question is the mobile telephony system known as GSM (Global System for Mobile communications). It will be understood that the present invention is not limited to this radio communication system but rather encompasses all systems for which the specifications are substantially equivalent.

The essential specifications of the mobile telephony system known as GSM will be recalled below. This system is a time division multiple access (TDMA) system. In this system, the information exchanged is generally transmitted in the form of digital data within time intervals (time slots: the term "slot" will be used to denote such a time interval since this is the term used by the person skilled in the art) The frame structure of the GSM system will be recalled below with reference to FIG. 1.

A TDMA frame is a set of eight successive slots s0 to s7. The slots of a given equal order of several successive TDMA frames together form what is known as a multiframe of a TDMA frame. For example, in FIG. 1, the slots s0 of the successive frames form the multiframe M0 and the slots s2 of the successive frames form the multiframe M2. There are two multiframe structures: one which groups together 26 slots and one which groups together 51 slots.

Superframe and hyperframe structures are also defined in the specifications of the GSM system, but these are not considered here.

For the transmission of user data, a mobile station has two slots which are respectively transmitted on two different carriers: one assigned to uplink transmission (mobile station to base station) and the other assigned to downlink transmission (base station to mobile station). These data may be useful data and they are then transmitted in logical channels known as TCH (Traffic CHannel), or they may be signalling data and they are then transmitted in logical channels known as SDCCH. Logical control channels may accompany these logical channels: SACCH (Slow Associated Control CHannel) and FACCH (Fast Associated Control CHannel).

A beacon channel is also implemented in order to allow a mobile station to connect to the most favourable base station and synchronise with the latter. This beacon channel is transmitted, by each base station of the system, on a particular frequency which is selected from the set of carriers attributed to the mobile station in question. It comprises the following logical channels transmitted in broadcast mode: the channel FCCH (Frequency Correction CHannel), the channel SCH (Synchronisation CHannel) and the channel BCCH (Broadcast Control CHannel). The channel FCCH is transmitted in the slot s0 of some predefined frames, for example the single frames 0, 10, 20, 30 and 40 of a multiframe containing 51 frames (see the slots s0 of the multiframe M0 marked with an X in FIG. 1). The channel SCH is transmitted in the slot s0 of the frame following that in which the channel FCCH has been transmitted, for example in the single frames 1, 11, 21, 31 and 41 of a multiframe containing 51 frames (see the slots s0 of the multiframe M0 marked with a + in FIG. 1).

A set of common logical channels is also provided in order to make it possible in particular to set up calls and allocate dedicated logical channels (TCH, SDCCH). These are not considered here.

When it is powered up, a mobile station examines the set of carriers that it receives in order to search therein for the signal which corresponds to a channel FCCH. Once this signal has been found, it can on the one hand adjust the frequency of the carrier received, but also on the other hand deduce therefrom a temporal position, so that it can align itself with the frame received on this carrier. In the next frame, it can then read, in the corresponding slot s0, the channel SCH in which it will find all the information required to perfect its alignment and its synchronisation with the frames. It can then read the channel BCCH which will provide it with information about the characteristics of the base station with which it is synchronised but also those of the neighbouring base stations.

In this state, the mobile station can start the setting up of a connection, normally by accessing the common channel RACH, or respond to a paging signal present on the channel PCH.

Once a connection has been set up for the transmission of data, the mobile station receives the common channels SCH, FCCH and BCCH not only from the base station to which it is connected but also from the neighbouring base stations. It can thus, according to the circumstances, connect to the base station which is most favourable at the time in question.

It will be noted that the logical channels of the beacon channel FCCH, SCH and BCCH are downlink channels, that is to say they are exclusively transmitted in broadcast mode by a base station to mobile stations.

Furthermore, it must be pointed out here that the frequencies assigned to the uplink direction are not in the same frequency band as those assigned to the downlink direction. More specifically, the frequency assigned to the uplink direction is shifted by a predetermined value with respect to the frequency assigned to the downlink direction.

BRIEF SUMMARY OF THE INVENTION

The object of the present invention is to propose a mobile station which can operate, on the one hand, as has just been described but also, on the other hand, in a direct mode, that is to say in a mode in which it can enter into communication with another mobile station without passing through a base station.

To this end, the present invention relates to a mobile station of a mobile radio communication system of the type comprising means for receiving synchronisation channels transmitted on at least one carrier so as to be able to synchronise with a base station and transmit data in a traffic channel defined with respect to said synchronisation channels.

According to the present invention, said mobile station is characterised in that it comprises means for transmitting synchronisation channels on a carrier normally transmitted by a base station; and means for transmitting a traffic channel on said carrier, said synchronisation and traffic channels being transmitted to at least one other mobile station so that the latter can synchronise with said mobile station and read said traffic channel.

According to another feature of the invention, it comprises means for, when it is the first to transmit on a carrier, transmitting its own synchronisation channels in a predefined manner, said mobile station then being known as the master, and, when it is not the first to transmit on a carrier, synchronising firstly with the synchronisation channels of the master mobile station of said carrier before transmitting its own synchronisation channels, said mobile station then being known as a slave.

Advantageously, said mobile radio communication system is of the FDD TDMA type, said synchronisation channels being a frequency correction channel (FCCH) and an actual synchronisation channel (SCH) transmitted in slots of equal order of some frames. It is advantageously provided for, when it is master, transmitting each of the frequency correction (FCCH) and synchronisation (SCH) channels in at least one slot of predefined order of some frames and for, when it is a slave of a master mobile station, transmitting each of the frequency correction and synchronisation channels in at least one of the other slots of said frames.

Furthermore, said mobile radio communication system is advantageously of the type in which the slots of equal order of successive frames form a multiframe and, in this case, said mobile station transmits, if it is master, its own synchronisation channels (FCCH and SCH) in predefined frames of a multiframe dedicated to synchronisation and its traffic channel in another multiframe allocated for this purpose and, if it is a slave, its own synchronisation channels (FCCH and SCH) in other frames of said multiframe dedicated to synchronisation and its traffic channel in another multiframe allocated for this purpose.

According to another feature of the present invention, said mobile station is characterised in that it comprises means for transmitting to the master mobile station, of which it has become a slave, a request for allocation of synchronisation channels and of a traffic channel and for, upon receipt of the response to said request from said master mobile station, either transmitting the allocated synchronisation channels and traffic channel if the response is positive, or changing carrier if the response is negative.

According to another feature of the invention, it comprises means for, when it wishes to set up a direct call, checking that this call has not already been set up and means for reading the traffic channel corresponding to the synchronisation channels of the calls already set up.

According to another feature of the invention, it transmits synchronisation channels which contain the identifier of the call made.

The present invention also relates to a method for setting up a call in direct mode which is implemented by a mobile station as has just been described, said call being made to at least one other mobile station. It is characterised in that it comprises:

a step of selecting a carrier from a predefined set of carriers;
a step of transmitting synchronisation channels on said selected carrier if said carrier is not being used for another call, said mobile station then becoming a master mobile station;
a step of transmitting a request to the master mobile station for said carrier if said carrier already being used for another call, said mobile station then being a slave of a master mobile station, said master mobile station in response allocating the synchronisation and traffic channels to said mobile station; and
a step of transmitting the synchronisation channels on said carrier allocated by said master station.

Advantageously, said call is identified by a call identifier, said method comprising a step of checking that said call has not already been set up and a step in which said mobile station joins said call identified by said call identifier in the case where said call has already been set up.

Advantageously, said method comprises a step of detecting a carrier which is carried out at the time of setting up the call, a step of selecting a carrier from a predefined set of carriers if no carrier is detected, and a step of transmitting the synchronisation channels on said selected carrier if said carrier is not being used for another call, said mobile station then becoming a master mobile station.

Advantageously, if said mobile station is a slave of a master mobile station and if it wishes to leave the call that it has set up, it stops transmitting in its traffic channel and its synchronisation channels. Similarly, if said mobile station is master and if it wishes to leave the call that it has set up, it stops transmitting in its traffic channel but continues to transmit its synchronisation channels until all the slave mobile stations of which it is master have stopped transmitting.

BRIEF DESCRIPTION OF THE DRAWINGS

The abovementioned features of the invention, as well as others, will become more clearly apparent from reading the following description of an example of embodiment, said description being given with reference to the appended drawing, in which.

DETAILED DESCRIPTION OF THE INVENTION

Figure 1:
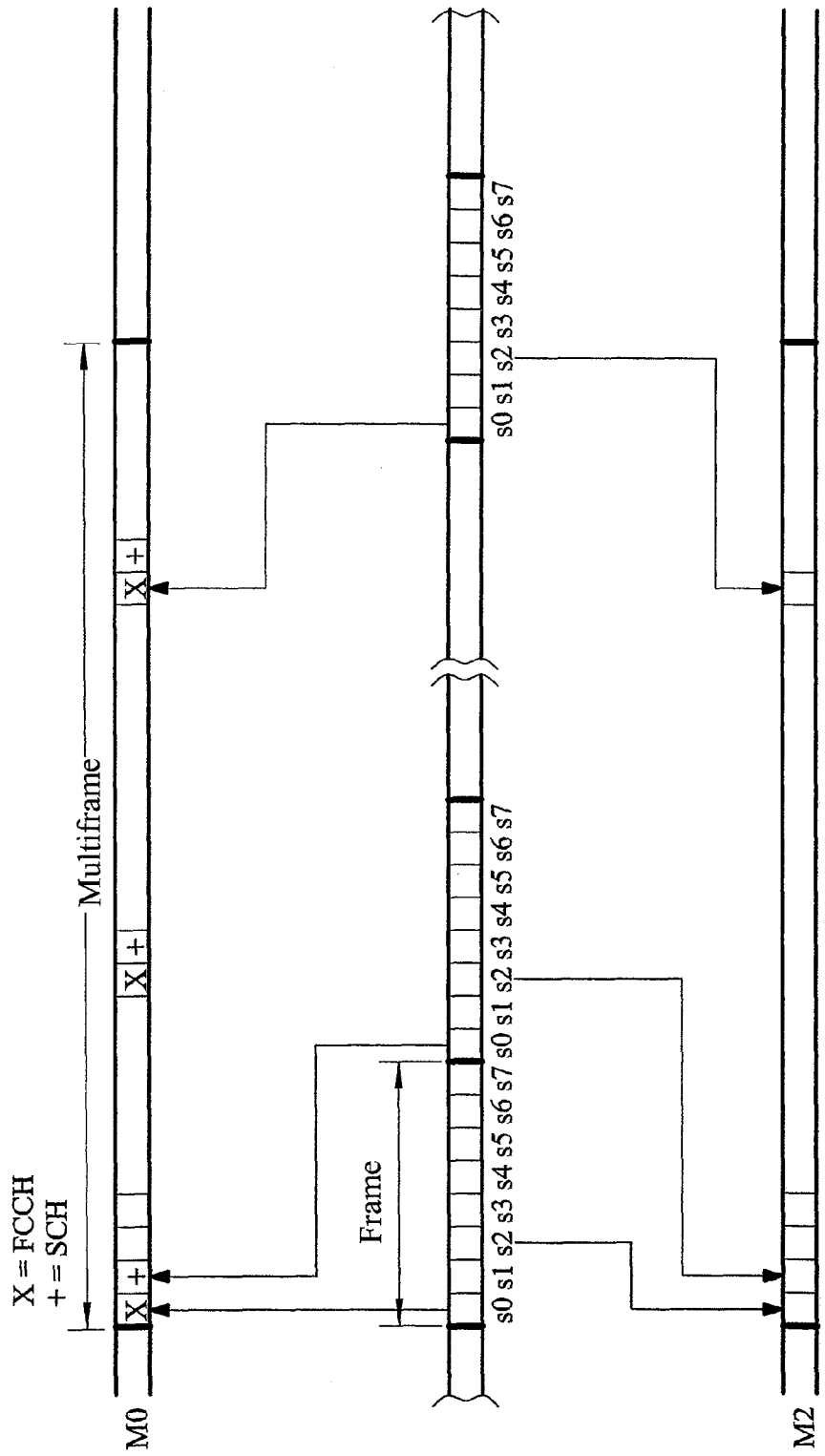
FIG. 1 is a diagram showing the relationship between frames and multiframes in a radio communication system of the GSM type with the synchronisation channels FCCH and SCH.
Figure 2:
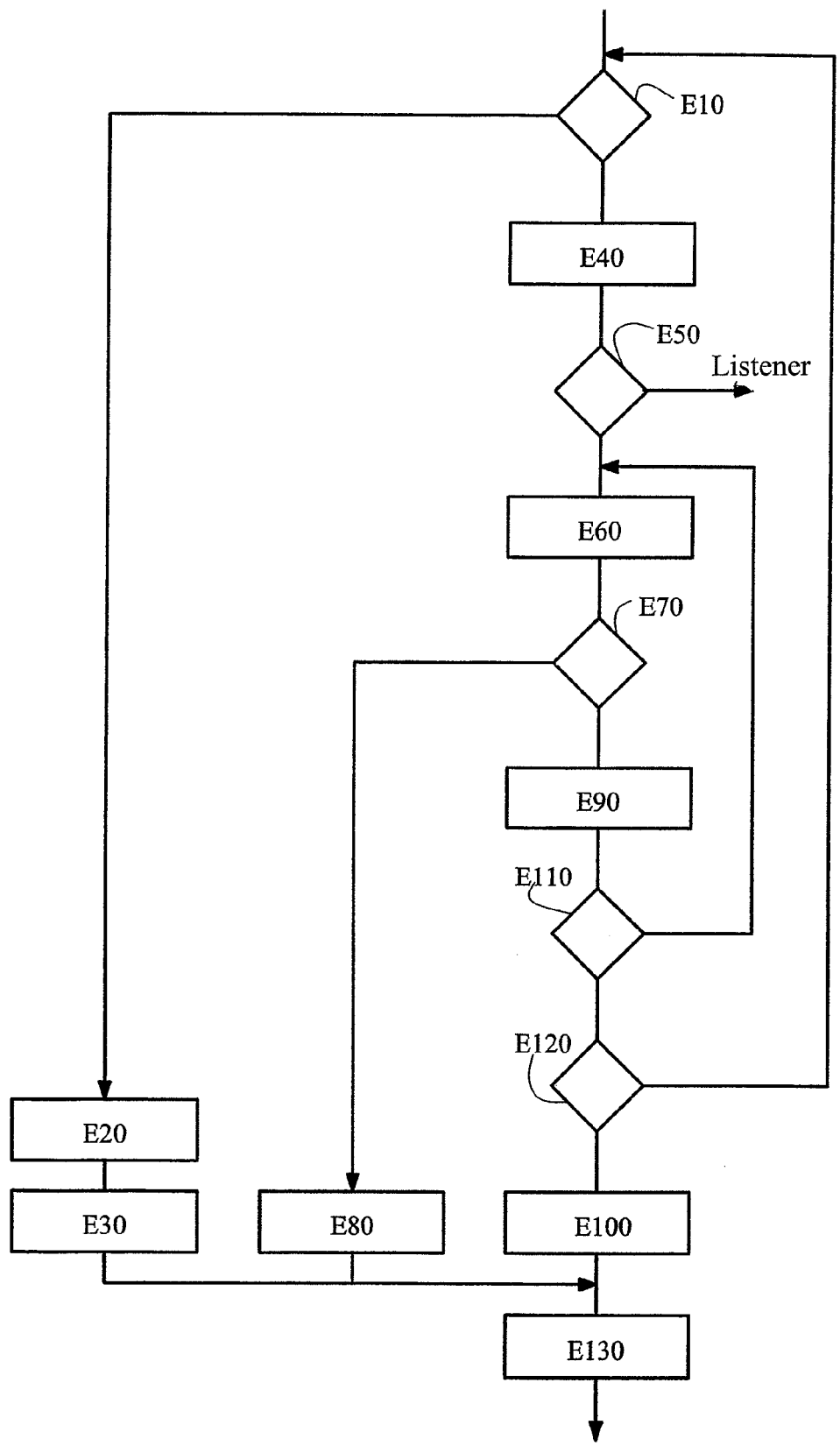
FIG. 2 is a diagram showing the operations carried out by a method for setting up a call in the direct mode according to the present invention, said method being implemented in a mobile station.

FIG. 2 is a diagram showing the operations which are carried out by a mobile station, hereinafter referred to as the calling mobile station, which wishes either to set up a call to another mobile station, said call being identified by a call identifier CID, or to respond to a call, identified by a call identifier CID (Call Identity), said call being made in the direct mode, that is to say without passing through a base station.

In the case of a group call, the call identifier CID is for example the group identifier GID. The communications set up are unidirectional from the calling mobile station, which operates as the talker, to one or more called mobile stations, which operate as listeners.

The call identifier CID could be, in other applications, the MSISDN number of a mobile station which the calling mobile station wishes to call.

We will therefore assume one calling mobile station for an identifier known as CID. The calling mobile station is set in operation, if this has not already been done.

In step E10, it checks whether it is receiving a carrier. If it is not receiving a carrier, it selects (step E20), for example randomly, a carrier from a list of carriers. It has for example received this list of carriers from a base station to which it has been previously connected or from the base station which is broadcasting it into the cell in which it is located at the moment in question. The calling mobile station then generates, in step E30, frames with the appropriate synchronisation channels. For example, it generates TDMA frames with synchronisation channels FCCH and SCH which it transmits in the slots s0 of some of said frames, the channel SCH following the channel FCCH by one frame. In these synchronisation channels, it specifies its own group identifier GID, the slot that it is using, in this case the slot s0, and its status which will hereinafter be referred to, as will be understood below, as the master status since this slot is the slot s0. It may also give the state of occupation of the other slots which, in this case, are free.

If it has detected at least one carrier in step E10, then in step E40 the calling mobile station examines the set of carriers received, determines their synchronisation channels one by one, that is to say firstly the channel FCCH of the carrier in question, then, in the frame following that in which the channel FCCH has appeared, each of the corresponding channels SCH so as to synchronise with each of them. It then determines, in step E50, whether a call with the identifier known as CID has or has not already been set up.

If it has, then a synchronisation channel which mentions it exists, for example a channel SCH. Then, by aligning itself with respect to the slot containing the channel SCH of the group in question, the calling mobile station reads the slots of the traffic channel TCH of the same multiframe and thus joins the call identified by the identifier CID. In the case of a group call, it joins the group identified by the identifier GID as a listener.

Figure 3:
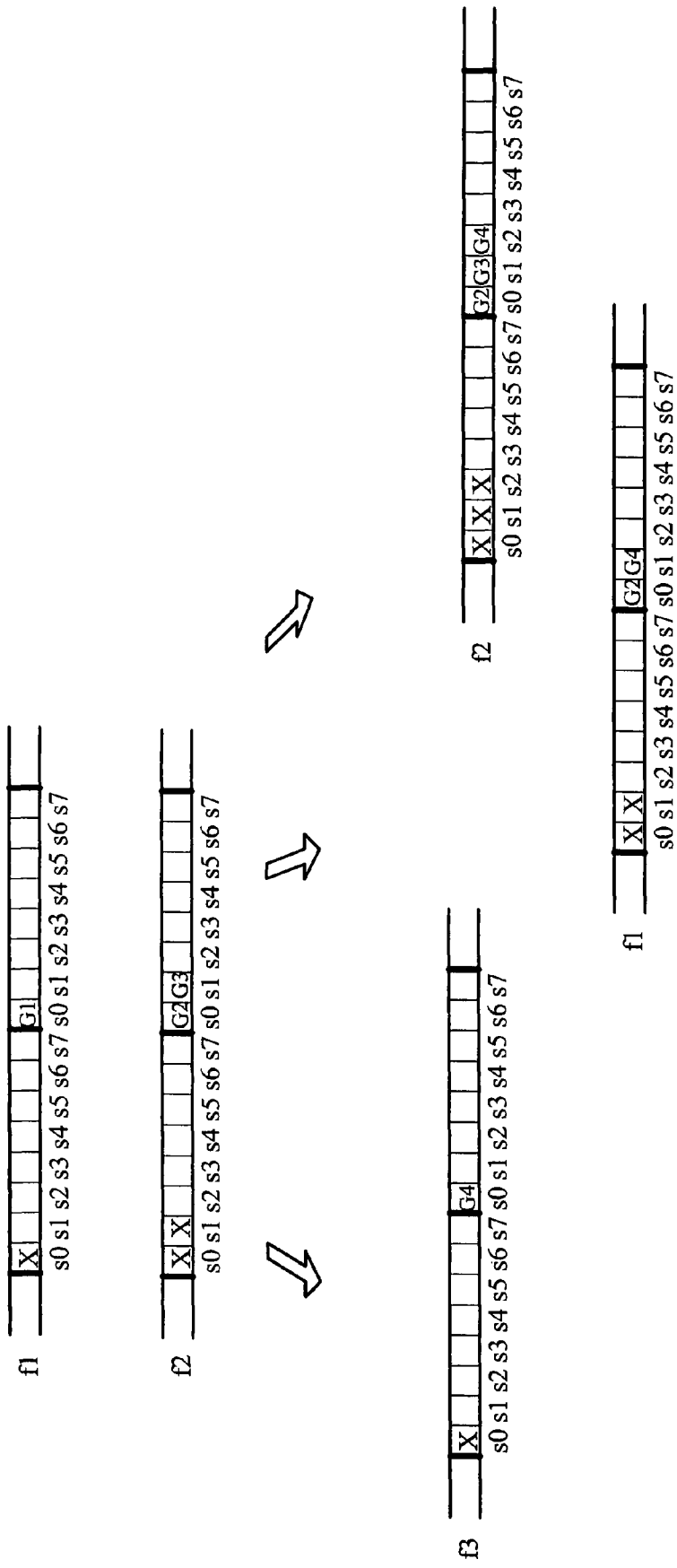
FIG. 3 shows the allocation of slots to a calling mobile station in accordance with the method according to the present invention.

For example, with reference to FIG. 3, two carriers f1 and f2 are received by the requesting mobile station. On the carrier f1, a frame contains, in the slot s0, the synchronisation channels FCCH and SCH, the latter indicating that the group G1 is communicating on this carrier f1 in the corresponding multiframe. On the carrier f2, a frame contains, in the slots s0 and s1, the synchronisation channels FCCH and SCH, the latter indicating respectively that the groups G2 and G3 are communicating on this carrier f2 in the corresponding multiframes.

If the identifier known as CID corresponding to one of the groups G1, G2 or G3, the calling mobile station joins the group as a mobile station operating as a listener.

If the calling station wishes to set up a call identified by an identifier CID which has not yet been set up (for example a call to the group G4 in FIG. 3), then in step E60 it selects, for example randomly, a carrier from a list of carriers. It has for example received this list of carriers from a base station to which it has been previously connected or from the base station which is broadcasting it in the cell in which it is located at the moment in question.

In step E70, it checks whether the carrier selected is already being used. If it is not, that is to say if it is not being transmitted by any mobile station (or base station) (this may be the case in respect of the carrier f3 in FIG. 3), the calling mobile station generates, in step E80, its own synchronisation channels FCCH and SCH which it transmits in the slots s0 of the frames in question. In these synchronisation channels, it specifies its own group identifier GID, the slot that it is using, in this case the slot s0, and its master or slave status, in this case the master status. It may also give the state of occupation of the other slots.

On the other hand, if the carrier selected is already being used (this may be the case in respect of the frequency f1 or the frequency f2 in FIG. 3), this is because a call already using the slot s0 for its synchronisation channel has already been set up and the calling mobile station then transmits, in step E90, a request to the master mobile station (that is to say the mobile station which set up the call occupying the slot s0 for its synchronisation channel SCH and its traffic channel TCH) so that said master mobile station authorises it to occupy a slot of the frame and allocates it a slot for its own synchronisation channel SCH and its own traffic channel TCH. This request is for example transmitted using the synchronisation channel SCH of the master mobile station.

By authorising the calling mobile station to occupy a slot, in response to said request, the master mobile station allocates to said calling mobile station a slot to be used so that the latter transmits, in step E100, its own synchronisation channels FCCH and SCH. In the example given in FIG. 3, in the case where the selected carrier is the carrier f1, it transmits its synchronisation channels in the slots s1 and, in the case where the selected carrier is the carrier f2, it transmits its synchronisation channels In the slots s2. In the synchronisation channel SCH, the calling mobile station specifies its own call identifier CID, the slot that it is using, and its status, which will be referred to as the slave status in opposition to the master status of the master mobile station, and also due to the fact that it occupies a slot which is not the slot s0. It may also give the state of occupation of the other slots.

For example, with reference to FIG. 3, the calling mobile station wishing to set up a call with the identifier CID corresponding to the group G4 will be allocated the slot s1 if it selects the carrier f1 and will be allocated the slot s2 if it selects the carrier f2.

It will be noted that it is the master mobile station which manages the allocation of the slots to the slave calling mobile stations and that this management may take account of parameters which are not taken into account in the examples mentioned in the present description.

If the master mobile station does not respond to said request after a predetermined period of time (step E110), the calling mobile station restarts the procedure at step E60.

If the master mobile station does not authorise (step E120) the requesting mobile station to occupy a slot of the frame, this is because it has already authorised another mobile station to occupy a slot of the frame in order to set up a call with the identifier known as CID. The calling mobile station goes back to step E10 so as to re-listen to all of the slots on the different carriers in order to determine the "talker" mobile station for this group and to synchronise with it.

Once the carrier and the slot to be occupied for the synchronisation channel SCH and for the traffic channel TCH have been determined and the synchronisation information has been transmitted in the channel SCH, the calling mobile station, in step E130, can transmit in the traffic channel TCH. The mobile stations identified by the call identifier CID can then, by aligning themselves with respect to the slot which contains the channel SCH of this call with which they are synchronised, read the slots of the corresponding traffic channel TCH and thus join this call as a listener.

In order for a mobile station which has set up a call to leave this call, the following cases may be considered. When a slave mobile station wishes to leave its call, it informs the master mobile station so that the latter liberates the corresponding channel SCH (it can then allocate it to a calling mobile station). The slave mobile station then stops transmitting.

When a master mobile station wishes to leave its call, it stops transmitting in its traffic channel TCH but continues to transmit in its synchronisation channel SCH so as to allow the slave mobile stations to still be synchronised. Only when all of these mobile stations have stopped transmitting does the master mobile station stop transmitting in its channel SCH. There will then be no further transmission for the carrier in question.

In order to make it easier to carry out step E50 for determining whether the call identified by the identifier known as CID has already been set up, the master mobile station may transmit in broadcast mode a channel BCCH (Broadcast Control CHannel) in which all of the calls set up are described by their respective identifiers and the slots that they are using in the frame of the carrier in question.

Figure 4:
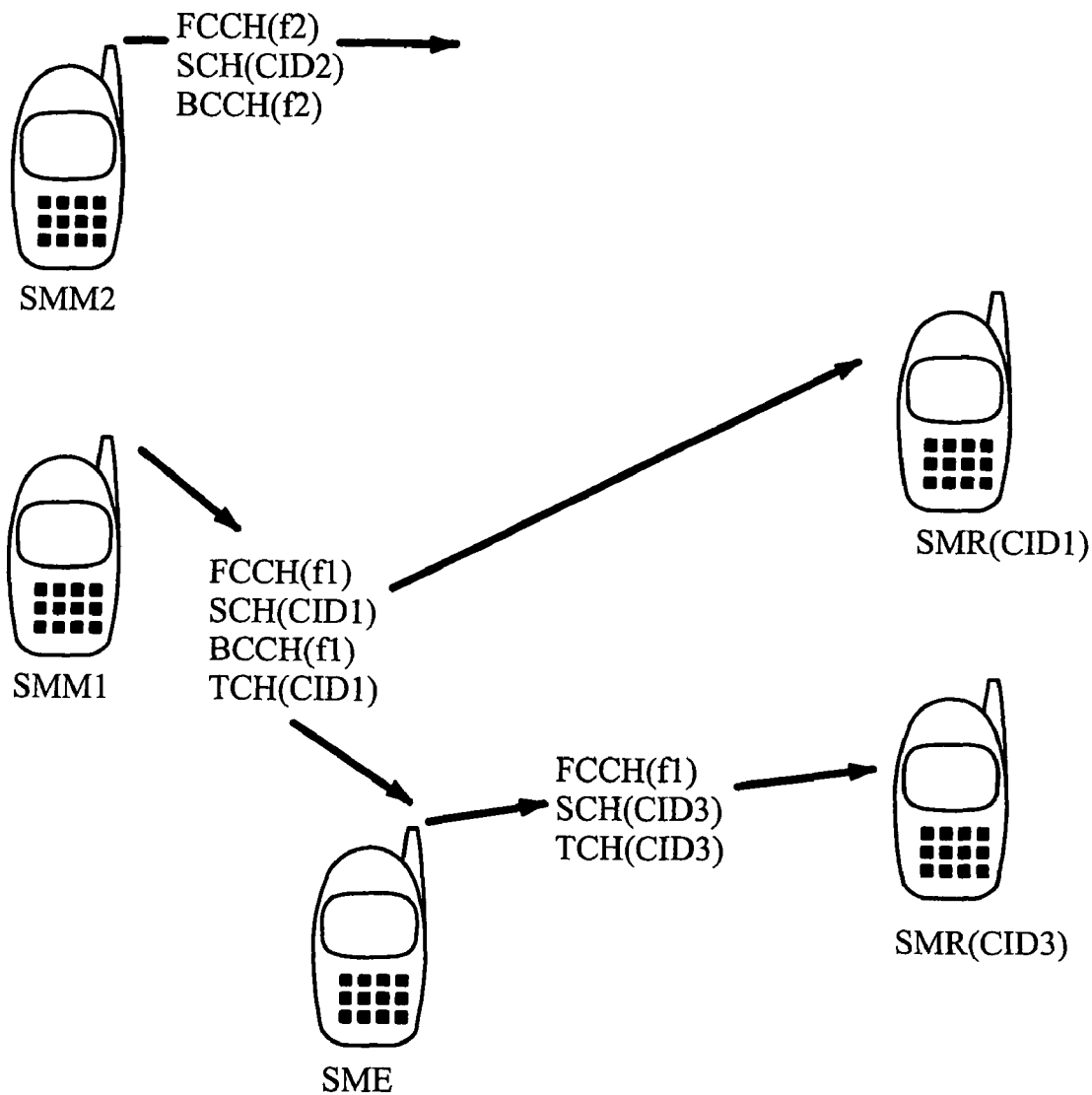
FIG. 4 shows the different channels transmitted by a set of mobile stations during calls in the direct mode according to the present invention.

FIG. 4 shows a master mobile station SMM1 for a call identified by a call identifier CID1 and for a carrier f1, a master mobile station SMM2 for a call identified by a call identifier CID2 and a carrier f2 which has stopped transmitting in the traffic channel TCH but which is still transmitting in its synchronisation channel SCH (for the reason mentioned above), a slave mobile station SME for a call identified by a call identifier CID3 and for the carrier f1, a mobile station SMR(CID1) which has answered the call CID1 and a mobile station SMR (CID3) which has answered the call CID3. It will be noted that there is necessarily a slave mobile station which transmits on the carrier f2 but this has not been shown in FIG. 4 for reasons of simplicity. It can be seen in FIG. 4 that the mobile station SMM1 transmits in the following channels: FCCH(f1), SCH(CID1), BCCH(f1) and TCH(CID1). The mobile station SMM2 transmits the following channels: FCCH(f2), SCH(CID2) and BCCH(f2). The mobile station SME transmits in the following channels: FCCH(f1), SCH (CID3) and TCH(CID3). As for the mobile station SMR, it receives the channel FCCH(f1), the channel SCH(CID3) and the traffic channel TCH(CID3).

The notations are as follows: FCCH(f) denotes the channel FCCH for the carrier f, BCCH(f) denotes the channel BCCH transmitted on the carrier f, SCH(CID) or TCH(CID) denotes the synchronisation channel or traffic channel for the call identified by the call identifier OD.

It will be noted that the mobile stations which set up a call must, in order to do so, transmit carriers which, during use when they are connected to a base station, are exclusively transmitted by the base station.

Figure 5:
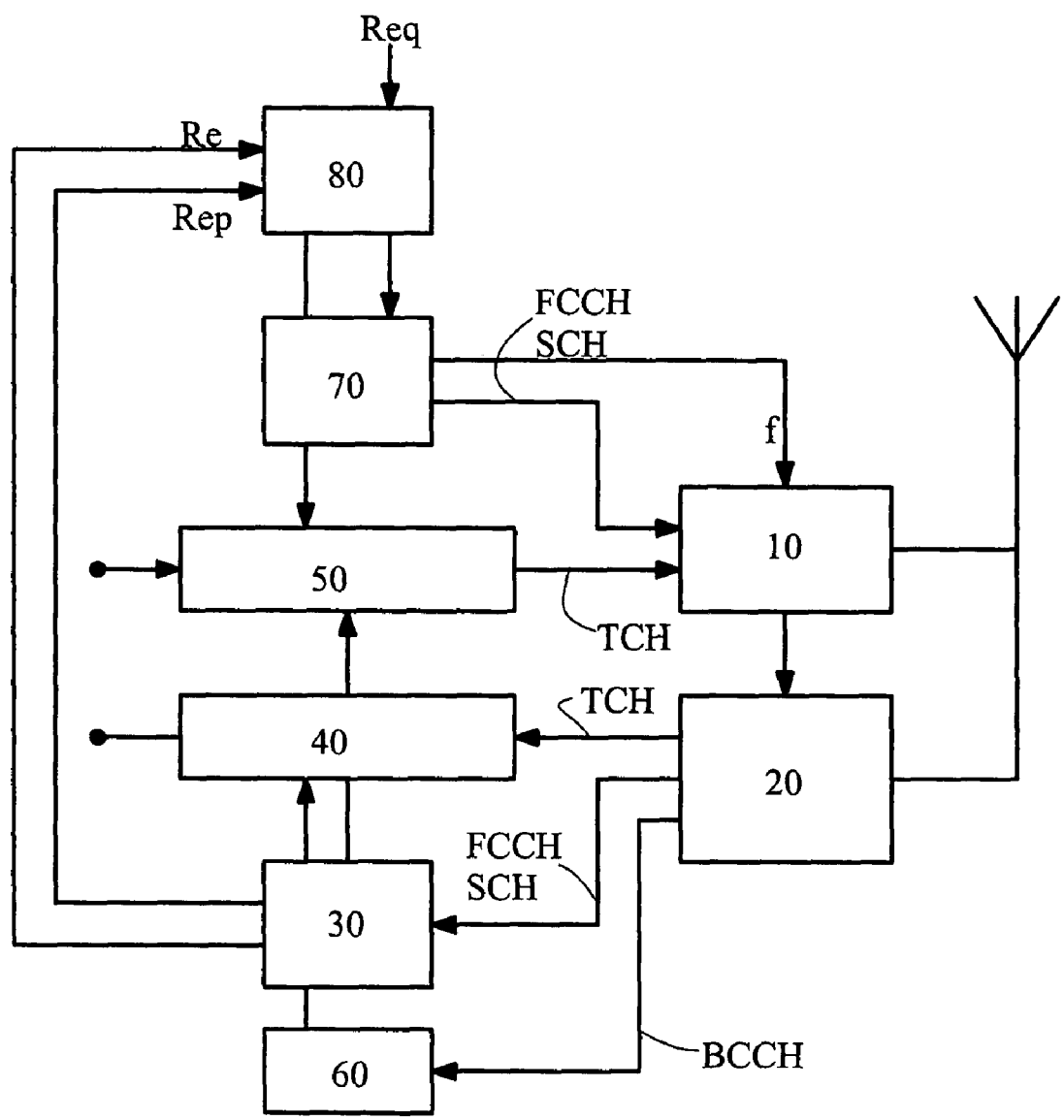
FIG. 5 is a block diagram of a mobile station according to the present invention.

FIG. 5 shows a mobile station according to the present invention. It comprises a transmitting unit 10 and a receiving unit 20 which are both designed to operate on a carrier f.

It comprises a synchronisation unit 30 for receiving synchronisation channels, for example channels FCCH and SCH, transmitted on at least one carrier f so as to be able to synchronise either with a base station, in the conventional mode of operation, or with another mobile station in the direct mode of operation which forms the subject matter of the present invention. The synchronisation unit 30 allows the synchronisation, on the one hand, of a traffic receiving unit 40 so as to be able to read the traffic channel TCH and, on the other hand, of a traffic transmitting unit 50 so as to be able to transmit the traffic channel TCH.

It also comprises a unit 60 for reading the channel BCCH. It comprises a unit 70 for transmitting synchronisation channels, for example FCCH, SCH and optionally BCCH, on the carrier f. It will be noted that the carrier f is normally transmitted by a base station so as to be able to be received by the receiving unit 20.

It also comprises a unit 80 for managing the synchronisation channels and traffic channels, and to do this controls the units 50 and 70. The unit 80 allows the mobile station, when it is the first to transmit on a carrier f, to allocate dedicated synchronisation channels FCCH and SCH to other identical mobile stations wishing to transmit on this same carrier, said mobile station becoming the master mobile station and said other mobile stations becoming slaves of said master mobile station. The unit 80 also allows the mobile station, when it is a slave; to transmit to the master mobile station of which it has become a slave a request Req for allocation of synchronisation channels and of a traffic channel. It is also this unit which, upon receipt of the response to said request from said master mobile station, orders, if the response is positive, the transmission by the unit 70 of the allocated synchronisation channels FCCH and SCH and traffic channel TCH and, if the response is negative, the change of carrier f. It is also this unit which, when this time the mobile station is master, receives the request Re from a slave mobile station, processes it and sends back the response, for example in the channel SCH.

The unit 60 makes it possible to read the broadcast channel BCCH and to check that the desired call has not already been set up. If the desired call has already been set up, it orders the traffic receiving unit 40 to read the corresponding traffic channel TCH.

In the present description, a frame/multiframe structure has been considered in which the channel SCH is located only in the frame which follows that of the channel FCCH. However, it may be advantageous to consider other frame/multiframe structures.

In general, in a first embodiment, a mobile station is provided for, when it is master, transmitting each of the frequency correction FCCH and synchronisation SCH channels in at least one slot of predefined order of some frames and for, when it is a slave of a master mobile station, transmitting each of the frequency correction and synchronisation channels in at least one of the other slots of said frames.

For example, a structure of the multiframe containing 26 frames could be as follows:
- slots 0, 13, 26, 39 for the transmission of the channel FCCH;
- slots 25 and 51 for the transmission of the control channel SACCH;
- slots 2, 4, 6, 15, 17, 19, 28, 30, 32, 41, 43 and 45 for the transmission of the channel SCH;
- other odd-numbered slots for the alternative transmission of the channel TCH; and
- other even-numbered slots for no transmission (idle).

In another embodiment of the present invention, the frame structure may be as follows. The synchronisation channels (the channels FCCH, SCH and optionally BCCH) of the different mobile stations which have set up a call are multiplexed, frame by frame, on a single predefined slot, for example the slot s0, whereas the traffic channels occupy the slots, for example the slots s1 to s7.

Figure 6:
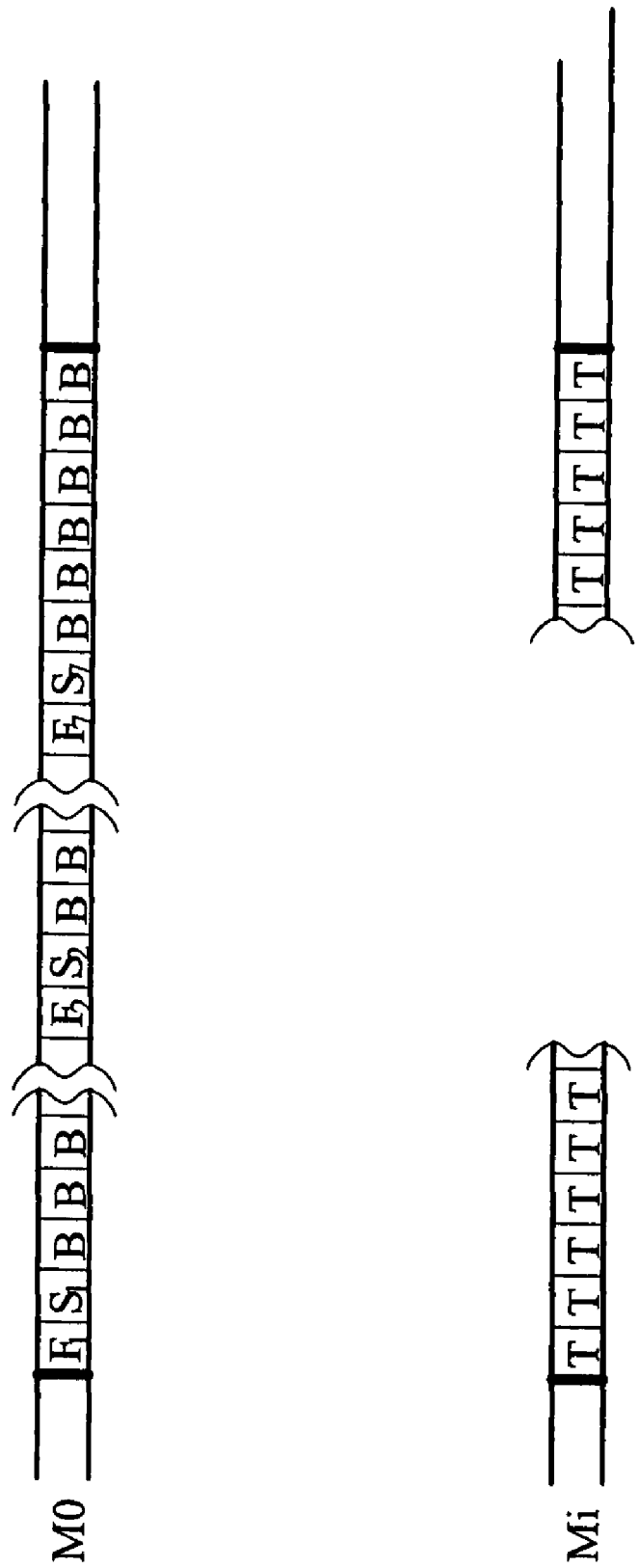
FIG. 6 is a diagram showing a frame structure for implementing the method of the present invention.

For example, FIG. 6 shows the multiframe M0 which carries the frequency control channels FCCH of each of the seven mobile stations which have set up a call, said channels being denoted respectively F1, F2, . . . , F7, the actual synchronisation channels SCH of the same mobile stations, said channels being denoted $S_1, S_2, \ldots, S_7$, and channels BCCH. The master mobile station with which the other mobile stations synchronise according to the present invention is for example the mobile station 1, the synchronisation channels of which are $F_1$ and $S_1$.

The multiframe M0 is not necessarily a multiframe containing 26 or 51 frames but may for example contain 70 frames, 10 frames then being associated with one mobile station.

Also shown is a multiframe $M_i$ (where i=1 to 7) allocated to a mobile station i for its traffic channel denoted here T. The multiframe $M_i$ is for example a multiframe containing 26 frames or 51 frames, such as the multiframes of the mobile radio communication system GSM.

Thus, a mobile station transmits, if it is master, its own synchronisation channels (FCCH and SCH) in predefined frames of the multiframe M0 dedicated to synchronisation and its traffic channel in one of the multiframes M1 to M7 allocated to it for this purpose and, if it is a slave, its own synchronisation channels (FCCH and SCH) in other frames of said multiframe M0 dedicated to synchronisation and its traffic channel in one of the multiframes M1 to M7 allocated for this purpose.

The invention claimed is:

1. A mobile station of a mobile radio communication system of a type comprising means for receiving a beacon channel comprising at least one frequency correction channel (FCCH), one synchronization channel (SCH), and at least one broadcast control channel (BCCH) transmitted on at least one carrier so as to be able to synchronise with a base station and transmit data in a traffic channel defined with respect to a synchronization channels including the least one FCCH and one SCH, said mobile station comprising:

means for transmitting a beacon channel comprising at least one FCCH and one SCH on a carrier normally exclusively transmitted by a base station;

means for transmitting a traffic channel (TCH) on said carrier, wherein said beacon channel transmitted from said means for transmitting said beacon channel and traffic channel are transmitted to at least one other mobile station so that the latter can synchronise with said mobile station and read said traffic channel;

means for, when said mobile station is the first to transmit on a carrier, said mobile station then being known as a master mobile station, transmitting the master mobile station's own beacon channel including at least one FCCH, one SCH, and at least one BCCH in a predefined manner to at least one slave mobile station;

means for, when said mobile station is the master mobile station, allocating resource for enabling a requesting mobile station to transmit said requesting mobile station's own beacon channel to at least one other mobile station; and means for, when it is not the first to transmit on a carrier, said mobile station then being known as a slave mobile station, synchronising firstly with the beacon channel of the master mobile station of said carrier before transmitting the slave mobile station's own beacon channel including at least one FCCH, one SCH without including at least one BCCH to other slave mobile station not receiving the master mobile station's own beacon channel.

2. The mobile station of claim 1, wherein the mobile radio communication system is of the FDD TDMA type, a beacon channel being a frequency correction channel (FCCH) and a synchronization channel (SCH) transmitted in slots of equal order of some frames.

3. The mobile station of claim 1, wherein when said mobile station is master, each of the frequency correction (FCCH) and synchronization (SCH) channels is transmitted in at least one slot of predefined order of some frames and for when said mobile station is a slave of a master mobile station, transmitting each of the frequency correction (FCCH) and synchronization (SCH) channels in at least one of the other slots of said frames.

4. The mobile station of claim 1, wherein the said mobile radio communication system is of the type in which the slots of equal order of successive frames form a multiframe, said mobile station transmitting, if it is master, its own beacon channel including FCCH and SCH in predefined frames of a multiframe dedicated to synchronization and its traffic channel (TCH) in another multiframe allocated for this purpose and, if it is a slave, its own beacon channel including FCCH and SCH in other frames of said multiframe dedicated to synchronization and its traffic channel (TCH) in another multiframe allocated for this purpose.

5. The mobile station of claim 1, further comprises means for transmitting to the master mobile station, of which it has become a slave, a request for allocation of a beacon channel and of a traffic channel (TCH) and for, upon receipt of the response to said request from said master mobile station, either transmitting the allocated beacon channel and traffic channel (TCH) if the response is positive, or changing carrier if the response is negative.

6. The mobile station of claim 1, further comprises means for, when it wishes to set up a direct call, checking that this call has not already been set up and means for reading traffic channel corresponding to the synchronization channels that is already set up.

7. The mobile station of claim 1, wherein said beacon channel transmitted from said means for transmitting said beacon channel contains identifier of call made.

8. A method for setting up a call in direct mode which is implemented by a master mobile station, said call being made to at least one other slave mobile station, comprising:

(a) selecting a carrier from a predefined set of carriers;

(b) transmitting a beacon channel comprising at least one frequency correction channel (FCCH), one synchronization channel (SCH), and at least one broadcast control channel (BCCH) on said selected carrier by said master mobile station if said carrier is not being used for another call;

(c) transmitting a request to the master mobile station for said carrier by a slave mobile station if said carrier is already being used for another call, transmitting a request to the master mobile station for said carrier from said slave mobile station, said master mobile station in response to the request allocating channels for beacon channel and traffic channel (TCH) to said slave mobile station; and (d) transmitting, by said slave mobile station, the slave station's own beacon channel including at least one FCCH, one SCH without including at least one BCCH to other slave mobile station on said carrier allocated by said master mobile station.

9. The method of claim 8, wherein the said call is identified by a call identifier, said method comprising a step of checking that said call has not already been set up and a step in which the master mobile station and the slave station join said call identified by said call identifier in the case where said call has already been set up.

10. The method of claim 8, further comprising detecting a carrier which is carried out at the time of setting up the call, selecting a carrier from a predefined set of carriers if no carrier is detected, and transmitting the beacon channel on said selected carrier by the master mobile station if said selected carrier is not being used for another call.

11. The method of claim 8, wherein if the slave mobile station wishes to leave the call that it has set up, the slave mobile station stops transmitting in its traffic channel (TCH) and its own beacon channel.

12. The method of claim 11, wherein if the master station wishes to leave the call that it has set up, the master station stops transmitting in its traffic channel (TCH) but continues to transmit its beacon channel until all the slave mobile stations of its master have stopped transmitting.

* * * * *